United States Patent
Lem et al.

(10) Patent No.: US 12,495,896 B2
(45) Date of Patent: Dec. 16, 2025

(54) RACK SYSTEM AND METHOD FOR OPERATING A RACK

(71) Applicant: Ford Global Technologies, LLC, Dearborn, MI (US)

(72) Inventors: Jeroen Lem, Wittem (NL); Marcel Grein, Geilenkirchen (DE); Ilya Popov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 18/473,847

(22) Filed: Sep. 25, 2023

(65) Prior Publication Data
US 2024/0108130 A1    Apr. 4, 2024

(30) Foreign Application Priority Data
Oct. 4, 2022  (DE) .......................... 102022125465.8

(51) Int. Cl.
*A47B 57/04*  (2006.01)
*A47B 96/02*  (2006.01)

(52) U.S. Cl.
CPC ............ *A47B 57/04* (2013.01); *A47B 96/025* (2013.01)

(58) Field of Classification Search
CPC . B60P 1/00; B60P 3/007; A45B 57/04; A45B 57/045; A47B 43/00; A47B 46/005; A47B 96/025
See application file for complete search history.

(56) References Cited

U.S. PATENT DOCUMENTS

| | | | | |
|---|---|---|---|---|
| 3,300,056 A | * | 1/1967 | Kaspar .................... | A47B 55/02 211/181.1 |
| 3,874,009 A | * | 4/1975 | Nosaka ..................... | B60P 3/32 5/118 |
| 3,982,801 A | * | 9/1976 | Heidorn ................. | A47B 57/06 62/132 |
| 4,627,542 A | * | 12/1986 | Fredrickson .............. | A47F 5/12 211/150 |
| 5,452,972 A | * | 9/1995 | Adams .................... | B60P 7/135 292/121 |
| 5,779,094 A | * | 7/1998 | Stingel, Jr. ............... | B65G 1/08 221/75 |

(Continued)

FOREIGN PATENT DOCUMENTS

| | | |
|---|---|---|
| CN | 112455303 A | 3/2021 |
| DE | 102004017663 A1 | 10/2005 |

(Continued)

*Primary Examiner* — Patrick D Hawn
(74) *Attorney, Agent, or Firm* — Vichit Chea; Price Heneveld LLP

(57) ABSTRACT

A rack system for a cargo space of a commercial vehicle having a rack with at least one shelf and at least one adjusting device for adjusting the shelf about a pivot axis extending in the width direction of the rack between a loading and unloading setting and a transport setting, In order to provide a rack system that can be used more efficiently and more ergonomically, the adjusting device is designed in such a way that a tilt angle of the shelf in the transport setting is greater than in the loading and unloading setting, and a load surface of the shelf in the transport setting faces away from an access side of the rack.

9 Claims, 4 Drawing Sheets

(56) References Cited

U.S. PATENT DOCUMENTS

| | | | | |
|---|---|---|---|---|
| 5,934,725 A * | 8/1999 | Bowers | | B60P 3/40 414/522 |
| 6,220,463 B1 * | 4/2001 | Pullen | | A47B 57/045 211/186 |
| 6,302,282 B1 * | 10/2001 | Gay | | A47F 5/12 248/242 |
| 6,484,893 B1 * | 11/2002 | Tkatch | | A47F 3/063 211/94.01 |
| 7,401,709 B2 * | 7/2008 | Stingel, Jr. | | B65G 11/086 221/75 |
| 7,757,615 B2 * | 7/2010 | McDonald, II | | A47B 46/005 108/108 |
| 7,963,383 B2 * | 6/2011 | Stingel, III | | B65G 1/026 414/331.04 |
| 8,529,001 B2 * | 9/2013 | Calvillo | | F25D 25/02 312/408 |
| 8,746,470 B2 * | 6/2014 | Reinbigler | | A47B 91/002 211/126.15 |
| 9,878,649 B2 | 1/2018 | Beere | | |
| 10,258,152 B1 * | 4/2019 | Lentine | | A47B 96/066 |
| 10,334,948 B2 * | 7/2019 | Xiang | | A47B 96/14 |
| 10,414,342 B2 * | 9/2019 | Williams | | B62D 33/04 |
| 10,470,565 B1 * | 11/2019 | Levi | | A47F 5/103 |
| 10,507,754 B2 * | 12/2019 | Ellis | | B60P 3/007 |
| 10,576,851 B2 * | 3/2020 | Salter | | B60N 2/36 |
| 10,694,843 B2 * | 6/2020 | Nuss | | A47B 57/06 |
| 10,779,641 B2 * | 9/2020 | Beere | | A47B 96/07 |
| 11,046,371 B2 * | 6/2021 | Rosenfeld | | B60R 9/06 |
| 11,208,048 B2 * | 12/2021 | Herriman | | B60R 5/04 |
| 11,344,117 B2 * | 5/2022 | Xiang | | A47B 51/00 |
| 11,470,961 B2 | 10/2022 | Henry, Jr. et al. | | |
| 11,745,666 B1 * | 9/2023 | Gerez | | B60R 5/003 296/37.1 |
| 11,840,169 B2 * | 12/2023 | Seemüller | | B60P 1/5442 |
| 11,892,229 B2 * | 2/2024 | Katkar | | F25D 25/02 |
| 11,992,119 B2 * | 5/2024 | Appelo | | A47B 43/00 |
| 12,280,743 B2 * | 4/2025 | Popov | | B60R 5/041 |
| 2003/0034356 A1 * | 2/2003 | Freudelsperger | | B65G 1/1376 221/289 |
| 2007/0069542 A1 * | 3/2007 | Steiger | | B60R 11/06 296/24.44 |
| 2008/0012372 A1 * | 1/2008 | Squyres | | B60P 1/00 296/24.44 |
| 2009/0127993 A1 * | 5/2009 | Hrubesch | | F25D 25/02 312/408 |
| 2009/0255292 A1 * | 10/2009 | Benz | | A47B 57/06 700/275 |
| 2011/0012490 A1 * | 1/2011 | Schwendemann | | G06Q 30/0283 70/20 |
| 2017/0143116 A1 * | 5/2017 | Ueda | | A47B 49/00 |
| 2017/0291766 A1 * | 10/2017 | Orth | | G06Q 10/0832 |
| 2024/0109495 A1 * | 4/2024 | Grein | | B60R 5/006 |
| 2024/0409018 A1 * | 12/2024 | Chen | | B60P 1/6436 |

FOREIGN PATENT DOCUMENTS

| | | |
|---|---|---|
| DE | 102016010687 A1 | 3/2018 |
| DE | 102019208681 A1 | 12/2020 |

* cited by examiner

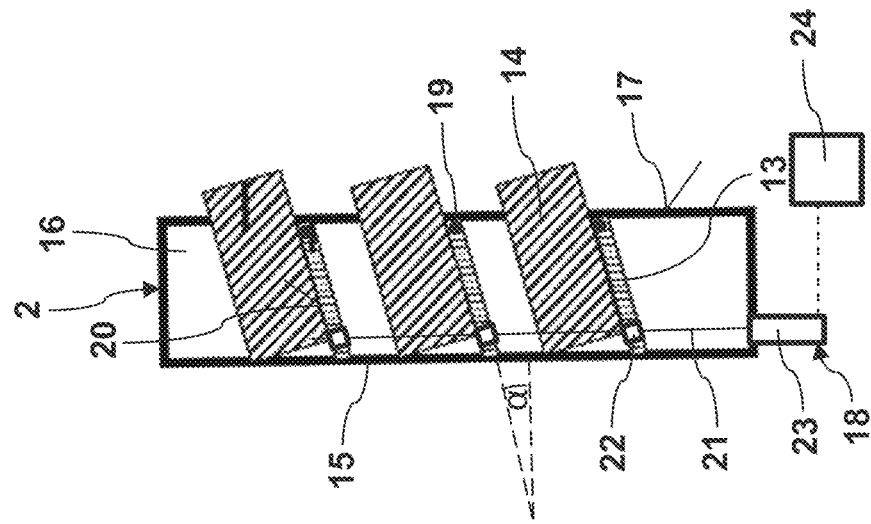
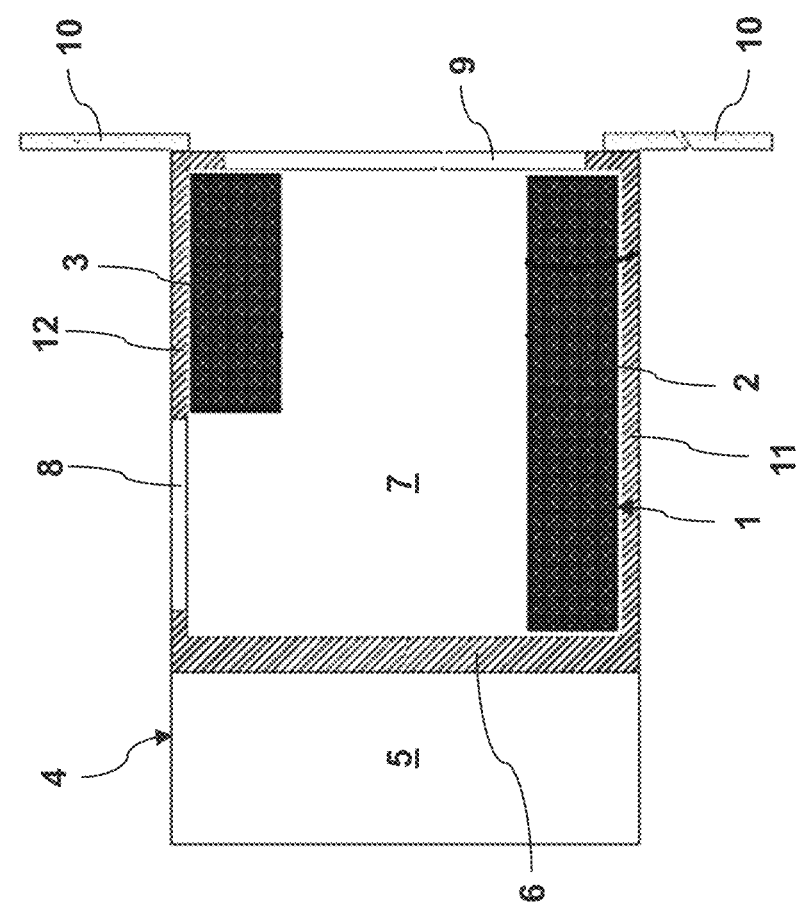
Fig. 1a
Fig. 1b

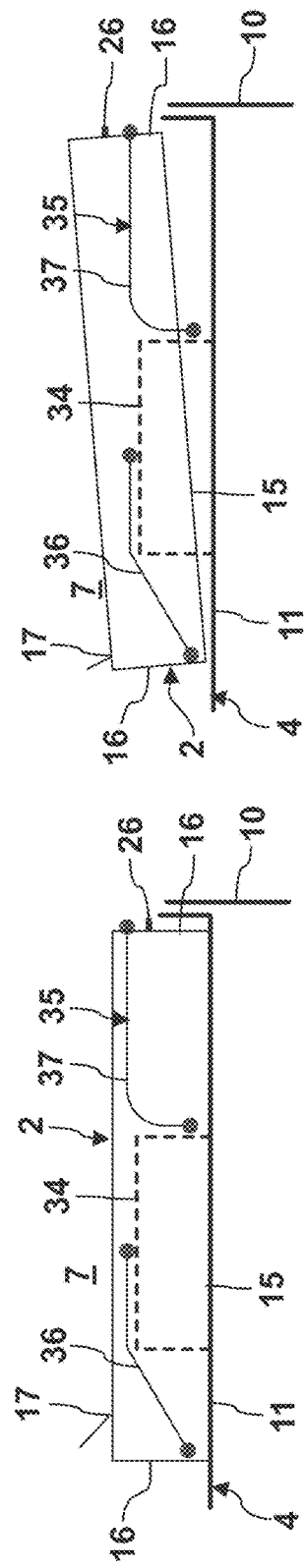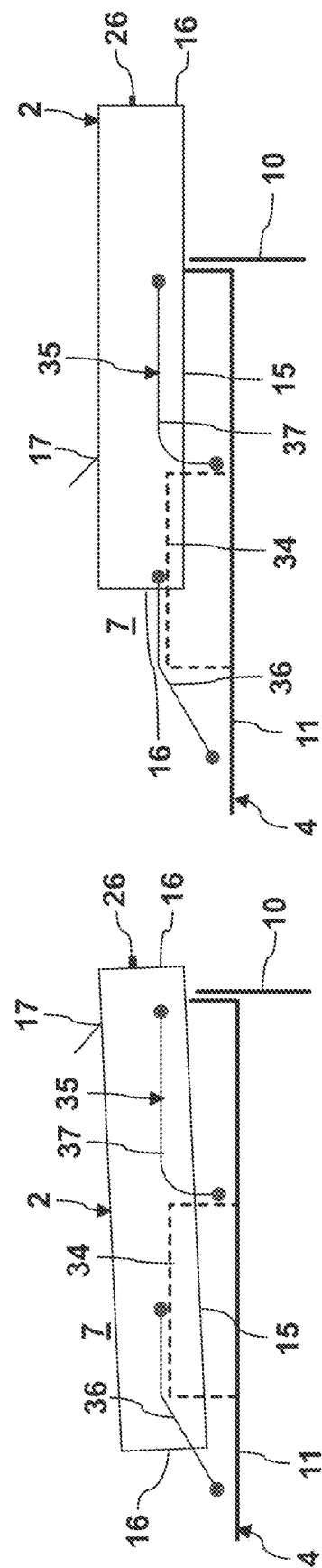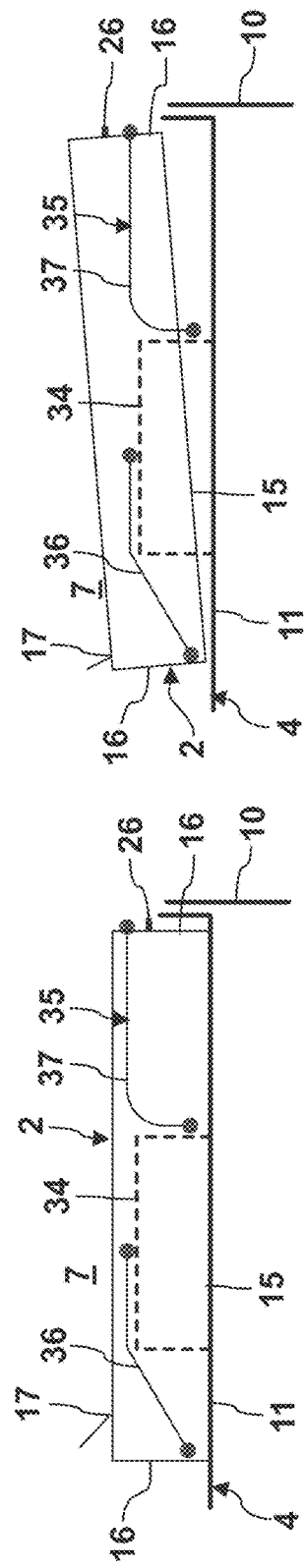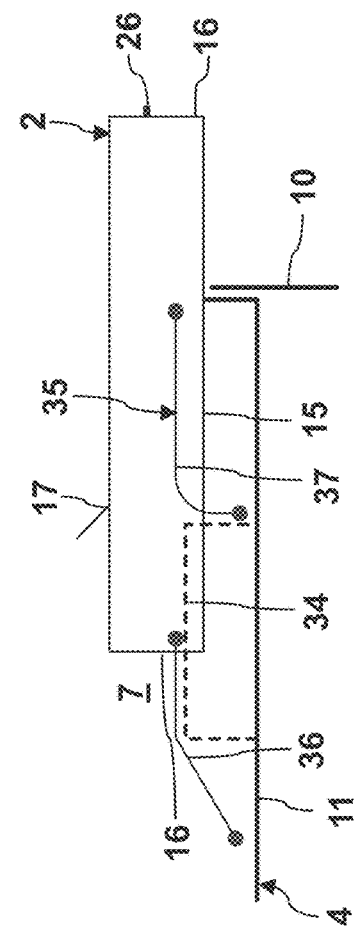

RACK SYSTEM AND METHOD FOR OPERATING A RACK

CROSS REFERENCE TO RELATED APPLICATION

This application claims foreign priority benefits under 35 U.S.C. § 119(a)-(d) to German Application No. 102022125465.8 filed Oct. 4, 2022, which is hereby incorporated by reference in its entirety.

FIELD OF THE DISCLOSURE

The present disclosure generally relates to a rack system for a cargo space of a vehicle, and more particularly relates to a commercial vehicle rack system having at least one rack with at least one adjustable shelf and a method for operating the rack.

BACKGROUND OF THE DISCLOSURE

Cargo spaces in commercial vehicles, such as delivery vehicles or tradesman's vehicles, are often equipped with racks that store and transport objects and help keep the cargo space organized. Owing to objects on the floor of the cargo space and owing to the space required for loading and unloading, it may not always be possible to get access to the entire rack.

Particularly in the case of relatively small commercial vehicles, there is generally a compromise between the width of a rack and the space available for objects, e.g., pallets, in the center of the cargo space. The width of a rack is usually determined by the width of the objects which the rack is supposed to hold. Large objects often include toolboxes. In practice, however, there is no standard width for toolboxes. Adapting a rack to a toolbox of the largest size is not efficient since the rack would be very wide, making the rack heavy and more expensive.

It would be desirable to provide a rack system for a cargo space of a commercial vehicle, which can be used more efficiently and ergonomically.

SUMMARY OF THE DISCLOSURE

According to a first aspect of the present disclosure, a rack system for a cargo space of a vehicle includes a rack having a shelf with a load surface and an adjusting device for adjusting the shelf about a pivot axis extending in a width direction of the rack between a loading and unloading setting and a transport setting, and the adjusting device is designed such that a tilt angle of the shelf in the transport setting is greater than in the loading and unloading setting, and the load surface of the shelf in the transport setting faces away from an access side of the rack.

Embodiments of the first aspect of the present disclosure can include any one or a combination of the following features:
- the adjusting device has a threaded spindle and a spindle nut guided on the threaded spindle and connected to the shelf, wherein the spindle nut is arranged on a rear end section of the shelf;
- the adjusting device has a controllable actuator for adjusting the shelf;
- a device for detecting at least one state parameter of the vehicle and for controlling the actuator in accordance with the at least one state parameter;
- the adjusting device has a drive wheel, which is in contact with a component that is arranged at a fixed location on the vehicle or is brought into contact with a component of the vehicle and is connected to drive a threaded spindle, wherein the adjusting device is designed such that the shelf is adjusted by movement of the rack;
- the adjusting device has a mechanism via which the drive wheel is connected to drive the threaded spindle;
- at least one movement device for moving the rack between a transport position, in which the rack can be arranged completely in the cargo space, and an access position, in which the rack is arranged at least partially outside the cargo space;
- the rack system is configured for use in the cargo space of a commercial vehicle.

According to another aspect of the present disclosure, a rack system for a cargo space of a commercial vehicle includes a rack having a shelf with a load surface, and an adjusting device for adjusting the shelf about a pivot axis extending in a width direction of the rack between a loading and unloading setting and a transport setting, wherein the adjusting device is designed such that a tilt angle of the shelf in the transport setting is greater than in the loading and unloading setting, and the load surface of the shelf in the transport setting faces away from an access side of the rack and the adjusting device has a threaded spindle and a spindle nut guided on the threaded spindle and is connected to the shelf. The adjusting device has a controllable actuator for adjusting the shelf and includes an electronic device for detecting at least one state parameter of the commercial vehicle and for controlling the actuator in accordance with the at least one state parameter.

Embodiments of the second aspect of the present disclosure can include any one or a combination of the following features:
- the rack system has a spindle nut, which is arranged on a rear end section of the shelf;
- the adjusting device has a drive wheel, which is in contact with a component that can be arranged at a fixed location on the commercial vehicle or can be brought into contact with a component of the commercial vehicle and is connected to drive a threaded spindle, and the adjusting device is designed such that the shelf is adjusted by movement of the rack;
- the adjusting device has a least one mechanism via which the drive wheel is connected to drive the threaded spindle;
- at least one movement device for moving the rack between a transport position, in which the rack is arranged completely in the cargo space, and an access position, in which the rack is arranged at least partially outside the cargo space;

According to another aspect of the present disclosure, a method for operating a rack system for a cargo space of a vehicle includes providing the rack system in the cargo space in the vehicle with the rack having a shelf with a load surface and an adjusting device for adjusting the shelf with the adjusting device about a pivot access extending in a width of the rack between a loading and unloading setting and a transport setting pivoting the shelf of the rack selectively about the pivot access extending in the width direction of the rack into the loading and unloading setting or into the transport setting, in which a tilt angle of the shelf in the transport setting is greater than in the loading and unloading setting, and the load surface of the shelf in the transport setting faces away from an access side of the rack.

detecting at least one state parameter of the vehicle and adjusting the shelf into the loading and unloading setting or into the transport setting based on the at least one state parameter;

moving the rack into a transport position, in which the rack is arranged completely in the cargo space, or into an access position, in which the rack is arranged at least partially outside the cargo space, wherein the shelf is brought into the transport setting by the movement of the rack into the transport position, and is brought into the loading and unloading setting via the movement of the rack into the access position; and the vehicle comprises a commercial vehicle.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 1a is a top schematic view of an exemplary embodiment of a commercial vehicle having a rack system with racks situated in transport positions;

FIG. 1b is a side schematic view of the rack system as seen from the rear end of the vehicle in FIG. 1a;

FIG. 2b is a side schematic view of the rack system as seen from the rear end of the vehicle in FIG. 2a;

FIG. 4a is schematic illustration of the rack system showing a first movement position of the rack;

FIG. 4b is a schematic illustration of the rack system showing a second movement position of the rack;

FIG. 4c is a schematic illustration of the rack system showing a third movement position of the rack; and FIG. 4d is a schematic illustration of the rack system showing a fourth movement position of the rack.

DETAILED DESCRIPTION OF PREFERRED EMBODIMENTS

Figure 2B:
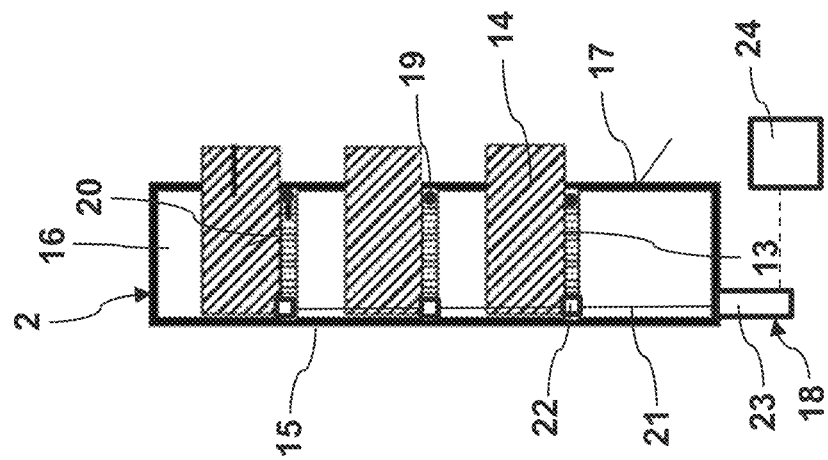

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rack system for a cargo space of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the different figures, identical parts are provided with the same reference signs, for which reason they are generally described once.

FIGS. 1a and 1b show two schematic illustrations of an exemplary embodiment of a rack system 1 installed on a vehicle with racks 2 and 3 situated in transport positions. FIG. 1a is a schematic plan view of the rack system 1. The rack system 1 is shown installed in a commercial vehicle 4, which has a driver's cab 5 and the cargo space 7 separated therefrom by a partition wall 6. The cargo space 7 has a side door 8, which is shown in a closed position. In addition, the cargo space 7 has a rear opening 9, which can be closed by use of a pair of doors 10, which are shown in open positions. Rack 2 is arranged on a left-hand side wall 11 of the cargo space 7, and rack 3 is arranged on a right-hand side wall 12 of the cargo space 7. The width of rack 3 is less than that of rack 2 in order to leave space for the side door 8.

In FIG. 1b, the rack 2 is shown in a schematic side view, which corresponds to a rear view of rack 2 in FIG. 1a. Purely by way of example, the rack 2 has three shelves 13 arranged one above the other in a row. An object 14, e.g. in the form of a tool box, is arranged on each shelf 13. In addition, the rack 2 has a rear wall 15 and two side walls 16, of which only one side wall 16 is shown in FIG. 1b. Opposite the rear wall 15, the rack 2 has an open access side 17.

The rack system 1 has an adjusting device 18 for adjusting the shelves 13 about a respective pivot axis 19, which extends in the width direction of rack 2, is arranged at the front side of the respective shelf 13 and is perpendicular to the plane of the drawing, between a loading and unloading setting shown in FIG. 2b and the transport setting shown in FIG. 1b. The adjusting device 18 is designed in such a way that a tilt angle α of the respective shelf 13 in the transport setting shown in FIG. 1b is greater than in the loading and unloading setting shown in FIG. 2b, and a load surface 20 of the respective shelf 13 in the transport setting faces away from the access side 17 of the rack 2.

The adjusting device 18 has a vertically extending threaded spindle 21 and, for each shelf 13, has a spindle nut 22, which is guided on the threaded spindle 21 and is connected to the respective shelf 13. The spindle nuts 22 are arranged on rear end sections of the shelves 13. In addition, the adjusting device 18 has an electrically controllable actuator 23 for the joint adjustment of the shelves 13, wherein the actuator 23 drives the threaded spindle 21. The actuator 23 is arranged at the base of the rack 2.

The rack system 1 furthermore has an electronic device 24 for detecting at least one state parameter of the commercial vehicle 4 and for controlling the actuator 23 in accordance with the at least one state parameter. The electronic device 24 may include a controller such as a microprocessor-based control unit, for example. The actuator 23 can be an electric motor, which is activated when the commercial vehicle 4 is stationary, i.e., stops or parks, and/or when a door is actuated. When such a situation is detected, the shelves 13 can be adjusted. To this extent, the adjusting device 18 that is shown can be automated.

Figure 2A:
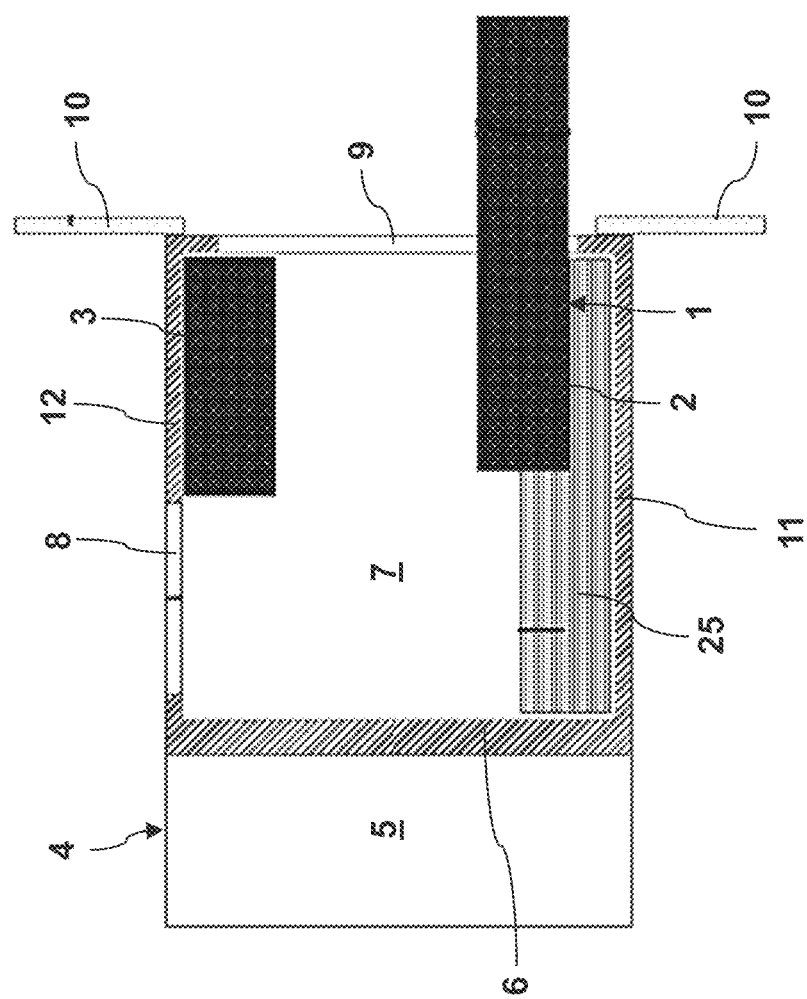
FIG. 2a is a schematic top view of the commercial vehicle having the rack system shown in FIG. 1a with a rack situated in an access position.

Furthermore, the rack system 1 has a movement device (shown by way of example in FIG. 4) for moving the rack 2 between the transport position shown in FIG. 1a, in which the rack 2 is arranged completely in the cargo space 7, and the access position shown in FIG. 2a, in which the rack 2 is arranged partially outside the cargo space 7.

FIGS. 2a and 2b show schematic illustrations of the rack system 1 shown in FIGS. 1a and 1b with a rack 2 situated in the access position, in which the rack 2 is arranged partially outside the cargo space 7 at the rear of the vehicle 9. For this purpose, the rack 2 has been moved or displaced at the rear end in the direction of the other rack 3. The other rack 3 is shown still in its transport position.

In FIG. 2b, the rack 2 is shown in a schematic side view, which corresponds to a rear view of the rack 2 seen in FIG. 2a. The shelves 13 of the rack 2 are in their loading and unloading settings. In the exemplary embodiment shown, the shelves 13 are arranged horizontally or not tilted in their loading and unloading settings. As a result, the objects 14 can be pulled out of the rack 2 easily without having to lift the objects 14 at the same time.

FIG. 2a furthermore shows a component 25 of the rack 2 which is attached to the commercial vehicle 4 and is situated below the rack 2 when the rack 2 is in the transport position. The component 25 can also be referred to as a rack base, along which the rack can be moved.

Figure 3:
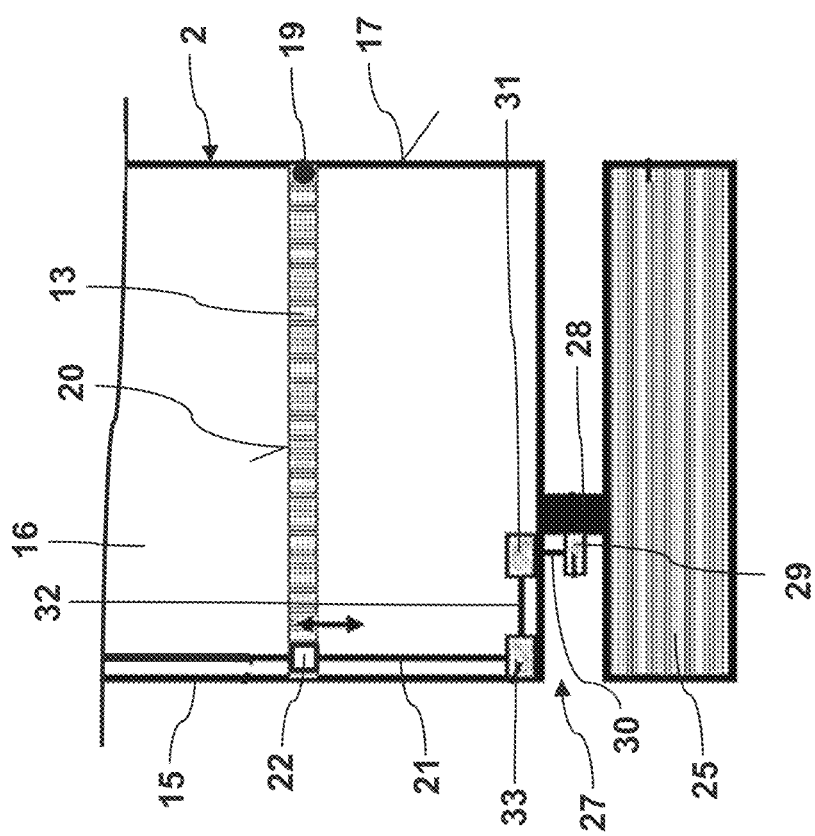
FIG. 3 is a schematic view of a rack system having a different adjusting device, according to another embodiment.

FIG. 3 shows a schematic side view of another exemplary embodiment of another adjusting device 27. As before, the rack system 1 also has a rack 2 with a plurality of shelves 13, of which only one shelf 13 is shown in FIG. 3. In addition, rack 2 has a rear wall 15 and two side walls 16, of which only one side wall 16 is shown in FIG. 3. Opposite the rear wall 15, rack 2 has an open access side 17.

The rack system 1 has the adjusting device 27 for adjusting the shelves 13 about a respective pivot axis 19, which extends in the width direction of the rack 2 and is arranged on the front side of the respective shelf 13, between a loading and unloading setting shown in FIG. 3 and a transport setting as shown by way of example in FIG. 1a. The adjusting device 27 is designed such that a tilt angle of the respective shelf 13 in the transport setting is greater than in the loading and unloading setting, and a load surface 20 of the respective shelf 13 in the transport setting faces away from the access side 17 of the rack 2.

The adjusting device 27 has a vertically extending threaded spindle 21 and, for each shelf 13, has a spindle nut 22, which is guided on the threaded spindle 21 and is connected to the respective shelf 13. The spindle nuts 22 are arranged on rear end sections of the shelves 13.

In addition, the adjusting device 27 has a drive wheel 28, which is in contact with a component 25 arranged at a fixed location on the commercial vehicle, is connected in terms of drive to the threaded spindle 21 and rotates on the component 25 when the rack 2 is moved perpendicularly to the plane of the drawing. For this movement, the rack system 1 has the movement device shown in FIG. 4 for moving rack 2 between a transport position (not shown), in which the rack 2 is arranged completely in the cargo space and which can correspond to that shown in FIG. 1a, and an access position (not shown), in which the rack 2 is arranged partially outside the cargo space and which can correspond to that shown in FIG. 2a.

The adjusting device 27 has a gearwheel 29, which can be driven by use of the drive wheel 28, a first shaft 30, which can be driven by use of the gearwheel, a first angle gear mechanism 31, which can be driven by use of the first shaft 30, a second shaft 32, which can be driven by use of the first angle gear mechanism 31, and a second angle gear mechanism 33, which can be driven by use of the second shaft 32, wherein the threaded spindle 21 can be driven by use of the second angle gear mechanism 33. The adjusting device 27 is thus designed in such a way that the shelves 13 are adjusted automatically by a movement of the rack 2. To this extent, a mechanical adjusting device 27 is described.

Of course, the exemplary embodiments of the different adjusting devices 18 and 27 can also be combined with one another, wherein the shelves can be adjusted when the relevant rack is moved, even if the actuator has a fault.

FIGS. 4a-4d show schematic illustrations of a rack system 1 according to one embodiment with various movement positions of a rack 2, which can be constructed with an adjusting device 18 and/or 27 corresponding to the rack shown in FIGS. 1a-1b and 2a-2b and/or corresponding to the rack shown in FIG. 3.

FIGS. 4a-4d are schematic plan views of the rack system 1 shown in various positions. The rack system 1 is installed in the commercial vehicle 4, which has a driver's cab (not shown), and the cargo space 7, which is separated therefrom. The cargo space 7 has the rear opening 9, which can be closed by use of doors 10, of which only one door 10 is shown, more specifically in an open position. Rack 2 is arranged on the left-hand side wall 11 of the cargo space 7 and has a handle 26 at the rear. A wheel arch 34 of the commercial vehicle 4, which is situated below rack 2, is also indicated.

The rack 2 has shelves (not shown in FIGS. 4a-4d) arranged one above the other in a row. In addition, the rack 2 has a rear wall 15 and two side walls 16. Opposite the rear wall 15, rack 2 has an open access side 17. In other respects, the rack 2 can be designed in a manner corresponding to FIGS. 1a-1b and 2a-2b and/or corresponding to FIG. 3.

The rack system 1 has an adjusting device (not shown) for adjusting the shelves about a respective pivot axis (not shown), which extends in the width direction of the rack 2 and is arranged on the front side of the respective shelf, between a loading and unloading setting and a transport setting. The adjusting device is designed in such a way that a tilt angle of the respective shelf in the transport setting is greater than in the loading and unloading setting, and a load surface (not shown) of the respective shelf in the transport setting faces away from the access side 17 of the rack 2. The adjusting device can be designed in a manner corresponding to FIGS. 1a-1b and 2a-2b and/or corresponding to FIG. 3.

Furthermore, the rack system 1 has a movement device 35 for moving the rack 2 between the transport position shown in FIG. 4a, in which the rack 2 is arranged completely in the cargo space 7, and the access position shown in FIG. 4d, in which rack 2 is arranged partially outside the cargo space 7.

The adjusting device 35 has two angled front guide rails 36, of which only a lower guide rail 36 is shown in FIGS. 4a-4d, and bent rear guard rails 37, of which only a lower guide rail 37 is shown in FIGS. 4a-4d. Rack 2 is movably guided or positively guided on the guide rails 36 and 37.

If the rack 2 is to be transferred from the transport position shown in FIG. 4a into the access position shown in FIG. 4d, a user grasps the handle 26 with their hand and first displaces the rear end of rack 2 away from the side wall 11, as shown in FIG. 4b. The user then pulls with force on the handle 26, with the result that rack 2 is displaced toward the rear, and the front end of rack 2 is simultaneously displaced away from the side wall 11 by use of the front guide rails 36, as shown in FIG. 4c. The user then continues to pull with force on the handle 26, with the result that the entire rack 2 is aligned parallel to the side wall 11 and is pulled out to the maximum extent at the rear from the cargo space 7 so as to arrive in the access position, as shown in FIG. 4d.

According to the disclosure, a rack system is provided having the adjusting device which is designed in such a way that a tilt angle of the shelf in the transport setting is greater than in the loading and unloading setting, and a load surface of the shelf in the transport setting faces away from an access side of the rack.

The features and measures presented individually in the description can be combined with one another in any technically feasible manner and indicate further embodiments of the rack system and method. The description additionally characterizes and specifies the rack system and method in particular in conjunction with the figures.

The at least one shelf of the rack can be pivoted or tilted about the pivot axis extending in the width direction of the rack in order to enable the shelf to be arranged with a greater tilt toward the rear side of the rack in its transport setting than in the loading and unloading setting. This enables an object situated on the shelf or on the load surface of the shelf to be efficiently held on the shelf by the downhill force acting on it and by the static friction between the object and the shelf while the commercial vehicle is traveling. In its transport setting, the shelf is arranged with a slope such that the load surface of the shelf faces the rear side of the rack. In this context, the rear side of the rack can be formed, for example, by a rear wall extending over the entire height of the rack. Alternatively, it is possible, for each correspondingly tiltable shelf, for the rear side of the rack to be formed by at least one wall which is situated on a rear side of the respective shelf, projects from the shelf away from the floor, extends over only a small part of the height of the rack and is connected firmly to the shelf, with the result that, when the shelf is pivoted, the wall pivots together with the shelf. Arranged opposite the rear side of the rack is the access side of the rack, that is to say that side of the rack which faces away from a side wall of the interior on which the rack is arranged when the rack is installed in a cargo space of a commercial vehicle. The rack is therefore accessible from the access side, in particular within the cargo space.

After the commercial vehicle has been stopped and/or parked, the at least one shelf can be pivoted about the pivot axis extending in the width direction of the rack into its loading and unloading setting, in which the shelf is arranged with a shallower slope than in the transport setting and, for example, may also be arranged horizontally. This enables a user to take an object from the rack without having to lift the object. Instead, the user can simply pull the object out of the rack with less force, and this can be significantly more ergonomic, especially if there is a need to remove a relatively heavy object from a higher rack level. Inserting an object into the rack is correspondingly simplified by the shallower slope of the shelf.

The adjusting device has at least one threaded spindle and at least one spindle nut, which is guided on the threaded spindle and is connected to the shelf, wherein the respective spindle nut is arranged on respective rear end sections of the shelf. In a further advantageous embodiment, the adjusting device can have an electronically controllable, actuator for adjusting the shelf. It is also advantageous if at least one electronic device for detecting at least one state parameter of the commercial vehicle and for controlling the actuator in accordance with the state parameter is provided. In another possible embodiment, provision can be made for the adjusting device to have at least one drive wheel, which is in contact with a component that can be arranged at a fixed location on the commercial vehicle or can be brought into contact with a component of the commercial vehicle and is connected in terms of drive to a threaded spindle, wherein the adjusting device is designed in such a way that the shelf is adjusted by movement of the rack. It is also expediently possible in this embodiment to provide for the adjusting device to have at least one mechanism, via which the drive wheel is connected in terms of drive to the threaded spindle.

The adjusting device can be of mechanical or electromechanical design, for example. The adjusting device can be of a manually actuatable design or can be at least partially automated.

The rack system according to the disclosure can also have two or more correspondingly tiltable shelves. In particular, all the shelves of the rack can be arranged in a correspondingly tiltable manner. In this arrangement, there can be a dedicated adjusting device for each shelf, or there is a common adjusting device for all the tiltable shelves.

The at least one shelf can be connected in an articulated manner to side walls of the rack to enable it to be pivoted about the pivot axis extending in the width direction of the rack, wherein the pivot axis in this case is an imaginary axis. Alternatively, the shelf can be connected to a physically present pivot axis which extends over the entire width of the rack and, for its part, can be connected to the side walls of the rack in such a way as to be pivotable about its longitudinal central axis.

The rack system can be arranged, for example, in a cargo space of a commercial vehicle in the form of a delivery vehicle or a tradesman's vehicle. To this extent, the subject matter of the disclosure also includes a correspondingly equipped commercial vehicle.

According to one advantageous embodiment, the adjusting device has at least one electrically controllable actuator for adjusting the shelf. In particular, this makes it possible to automate the adjusting device. The actuator can, for example, have an electric motor, by use of which at least one adjusting element of the adjusting device can be driven. The adjusting element can be, for example, a threaded spindle on which a spindle nut connected to the shelf is guided.

According to another advantageous embodiment, the rack system has at least one electronic device for detecting at least one state parameter of the commercial vehicle and for controlling the actuator in accordance with the at least one state parameter. This enables the adjusting device to be fully automated. If, for example, as the state parameter(s), the device detects that the commercial vehicle has been stopped and/or parked or that a door of the cargo space of the commercial vehicle has been opened, the device can operate the actuator in such a way that the shelf is moved automatically from its transport setting into its loading and unloading setting. This could therefore also be referred to as a smart adjusting device. At the same time, provision may advantageously be made that not every stop of the commercial vehicle causes activation of the actuator. Such activation could be omitted, for example, when stopping at traffic lights or give way signs or in traffic jams. This can be validated, for example, by use of onboard monitoring devices, such as cameras, sensors, or the like, which detect such a situation and can transmit it to suitable decision-making recipients.

According to another advantageous embodiment, the rack system has at least one movement device for moving the rack between a transport position, in which the rack is arranged completely in the cargo space, and an access position, in which the rack is arranged at least partially outside the cargo space, wherein the adjusting device is designed in such a way that the shelf is automatically adjusted by moving the rack. Moving the rack at least partially out of the cargo space enhances the accessibility of the rack and makes possible more ergonomic handling of objects. By use of the movement device, the rack can be moved at least partially out of the cargo space of the commercial vehicle, for example at the rear, that is to say, in particular, can be moved in the longitudinal direction of the commercial vehicle. In this case, provision can additionally be made for the movement device to be designed in such a way that, at the beginning of the movement, the rack is simultaneously is also displaced laterally in the cargo space, thus enabling the rack, in its transport position, to be arranged closer to a cargo-space side wall, which creates more space in the center of the loading floor of the cargo space. The pivoting of the shelf about the pivot axis extending in the width direction of the rack is brought about positively by the movement of the overall rack, i.e. is dependent on this movement. For this purpose, the adjusting device is designed such that the shelf is pivoted from its transport setting into its loading and unloading setting when the rack is moved from its transport position into its access position, and vice versa.

According to another advantageous embodiment, the adjusting device has at least one threaded spindle, at least one spindle nut, which is guided on the threaded spindle and is connected to the shelf, and at least one drive wheel, which is in contact with a component that can be arranged at a fixed location on the commercial vehicle or can be brought into contact with a component of the commercial vehicle and is connected to the threaded spindle in terms of drive. When the drive wheel rotates along the component during a movement of the rack, the threaded spindle is made to rotate about its longitudinal central axis by way of the drive connection between the drive wheel and the threaded spindle, thereby adjusting the shelf. Depending on the direction of rotation of the drive wheel, the shelf is pivoted in the direction of its loading and unloading setting or in the direction of its transport setting. The drive wheel can be designed as a simple wheel or as a gearwheel which can also engage in a component designed as a threaded rod.

According to another advantageous embodiment, the adjusting device has at least one mechanism, via which the drive wheel is connected in terms of drive to the threaded spindle. The mechanism can be designed as a reduction gear mechanism, for example, in order to enable the shelf to be pivoted over a relatively small suitable angular range during a movement of the rack. Moreover, the adjusting device can have at least one worm gear mechanism, bevel gear mechanism, or other mechanism for angular transmission of rotary movements.

A method having a rack system with at least one shelf of the rack can be brought selectively, by pivoting about a pivot axis extending in the width direction of the rack, into a loading and unloading setting or into a transport setting, in which a tilt angle of the shelf is greater than in the loading and unloading setting, and a load surface of the shelf faces away from an access side of the rack.

The advantages mentioned above in respect of the rack system are correspondingly associated with the method. In particular, the rack system according to one of the abovementioned embodiments or a combination of at least two of these embodiments with one another can be used for carrying out the method.

According to an advantageous embodiment, at least one state parameter of the commercial vehicle is detected electronically, and the shelf is brought into the loading and unloading setting or into the transport setting in accordance with the state parameter.

According to another advantageous embodiment, the rack is brought selectively, by being moved, into a transport position, in which the rack is arranged completely in the cargo space, or into an access position, in which the rack is arranged at least partially outside the cargo space, wherein the shelf is brought into the transport setting by the movement of the rack into the transport position, and is brought into the loading and unloading setting by the movement of the rack into the access position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A rack system for a cargo space of a vehicle, the rack system comprising:
    a rack having a shelf with a load surface; and
    an adjusting device for adjusting the shelf about a pivot axis extending in a width direction of the rack between a loading and unloading setting and a transport setting, wherein the adjusting device is designed such that a tilt angle of the shelf in the transport setting is greater than in the loading and unloading setting, and the load surface of the shelf in the transport setting faces away from an access side of the rack, wherein the adjusting device has a threaded spindle and a spindle nut guided on the threaded spindle and connected to the shelf, wherein the spindle nut is arranged on a rear end section of the shelve, wherein the adjusting device has a controllable actuator for adjusting the shelf, and wherein the adjusting device has a drive wheel, which is in contact with a component that is arranged at a fixed location on the vehicle or is brought into contact with a component of the vehicle and is connected to drive the threaded spindle, wherein the adjusting device is designed such that the shelf is adjusted by movement of the rack; and
    a device for detecting at least one state parameter of the vehicle and for controlling the actuator in accordance with the at least one state parameter.

2. The rack system according to claim 1, wherein the adjusting device has a mechanism via which the drive wheel is connected to drive the threaded spindle.

3. The rack system according to claim 2, further comprising at least one movement device for moving the rack between a transport position, in which the rack can be arranged completely in the cargo space, and an access position, in which the rack is arranged at least partially outside the cargo space.

4. The rack system according to claim 1, wherein the rack system is configured for use in the cargo space of a commercial vehicle.

5. A rack system for a cargo space of a commercial vehicle, the rack system comprising:
    a rack having a shelf with a load surface;
    an adjusting device for adjusting the shelf about a pivot axis extending in a width direction of the rack between a loading and unloading setting and a transport setting, wherein the adjusting device is designed such that a tilt angle of the shelf in the transport setting is greater than in the loading and unloading setting, and the load surface of the shelf in the transport setting faces away from an access side of the rack;
    wherein the adjusting device has a threaded spindle and a spindle nut guided on the threaded spindle and is connected to the shelf, wherein the spindle nut is arranged on a rear end section of the shelf, and wherein the adjusting device has a drive wheel, which is in contact with a component that is configured to be arranged at a fixed location on the commercial vehicle or can be brought into contact with a component of the commercial vehicle and is connected to drive the threaded spindle, wherein the adjusting device is designed such that the shelf is adjusted by movement of the rack;
    wherein the adjusting device has a controllable actuator for adjusting the shelf; and
    an electronic device for detecting at least one state parameter of the commercial vehicle and for controlling the actuator in accordance with the at least one state parameter.

6. The rack system according to claim 5, wherein the adjusting device has at least one mechanism via which the drive wheel is connected to drive the threaded spindle.

7. The rack system according to claim 6, further comprising at least one movement device for moving the rack between a transport position, in which the rack is arranged completely in the cargo space, and an access position, in which the rack is arranged at least partially outside the cargo space.

8. A method for operating a rack system for a cargo space of a vehicle, the method comprising:
    providing the rack system in the cargo space in the vehicle with a rack having a shelf with a load surface and an adjusting device for adjusting the shelf;
    adjusting the shelf with the adjusting device about a pivot axis extending in a width of the rack between a loading and unloading setting and a transport setting; and
    pivoting the shelf of the rack selectively about the pivot access extending in the width direction of the rack into the loading and unloading setting or into the transport setting, in which a tilt angle of the shelf in the transport setting is greater than in the loading and unloading setting, and the load surface of the shelf in the transport setting faces away from an access side of the rack;
    detecting at least one state parameter of the vehicle;
    adjusting the shelf into the loading and unloading setting or into the transport setting based on the at least one state parameter; and
    moving the rack into a transport position, in which the rack is arranged completely in the cargo space, or into an access position, in which the rack is arranged at least partially outside the cargo space, wherein the shelf is brought into the transport setting by the movement of the rack into the transport position, and is brought into the loading and unloading setting via the movement of the rack into the access position.

9. The method of claim 8, wherein the vehicle comprises a commercial vehicle.

* * * * *